United States Patent
Mantri et al.

(10) Patent No.: US 10,253,265 B2
(45) Date of Patent: *Apr. 9, 2019

(54) CATALYST ASSISTED HYDROTHERMAL CONVERSION OF BIOMASS TO CRUDE BIO-OIL

(71) Applicant: Reliance Industries Limited, Mumbai (IN)

(72) Inventors: Kshudiram Mantri, Medinipur (IN); Chidambaram Mandan, Tamil Nadu (IN); Ramesh Bhujade, Thane (IN); Nagesh Sharma, Vadodara (IN); Raksh Vir Jasra, Vadodara (IN)

(73) Assignee: RELIANCE INDUSTRIES LIMITED, Mumbai (IN)

( * ) Notice: Subject to any disclaimer, the term of this patent is extended or adjusted under 35 U.S.C. 154(b) by 0 days.

This patent is subject to a terminal disclaimer.

(21) Appl. No.: 15/129,934

(22) PCT Filed: Mar. 3, 2015

(86) PCT No.: PCT/IB2015/051541
§ 371 (c)(1),
(2) Date: Sep. 28, 2016

(87) PCT Pub. No.: WO2015/145279
PCT Pub. Date: Oct. 1, 2015

(65) Prior Publication Data
US 2017/0175002 A1   Jun. 22, 2017

(30) Foreign Application Priority Data

Mar. 28, 2014 (IN) .......................... 1143/MUM/2014

(51) Int. Cl.
| C10G 1/06 | (2006.01) |
| C10G 1/00 | (2006.01) |
| C10G 1/02 | (2006.01) |
| C10L 1/32 | (2006.01) |
| C10L 1/02 | (2006.01) |
| C10L 1/04 | (2006.01) |

(52) U.S. Cl.
CPC .................. *C10G 1/02* (2013.01); *C10L 1/02* (2013.01); *C10L 1/04* (2013.01); *C10L 1/32* (2013.01); *C10G 2300/1011* (2013.01); *C10G 2300/80* (2013.01); *C10L 2200/0469* (2013.01); *C10L 2290/06* (2013.01); *Y02P 30/20* (2015.11)

(58) Field of Classification Search
None
See application file for complete search history.

(56) References Cited

U.S. PATENT DOCUMENTS

| 8,450,111 B2 | 5/2013 | Salvo et al. | |
| 2007/0215300 A1* | 9/2007 | Upfal | ....................... D21C 3/20 |
| | | | 162/29 |
| 2009/0158638 A1* | 6/2009 | Hatcher | .................. C10L 1/026 |
| | | | 44/308 |
| 2009/0234146 A1* | 9/2009 | Cooney | .............. B01D 11/0288 |
| | | | 554/174 |
| 2010/0233761 A1 | 9/2010 | Czartoski et al. | |
| 2010/0319862 A1 | 12/2010 | Rahman | |
| 2011/0245444 A1* | 10/2011 | Miller | ....................... C07C 9/00 |
| | | | 526/346 |

OTHER PUBLICATIONS

Indian Patent Application No. 2899/MUM/2013, dated Sep. 6, 2013, 48 pages.
International Search Report and Written Opinion for International Application No. PCT/IB2015/051541, dated Jun. 24, 2015, 9 pages.

* cited by examiner

*Primary Examiner* — Philip Y Louie
(74) *Attorney, Agent, or Firm* — Westman, Champlin & Koehler, P.A.

(57) ABSTRACT

The present disclosure relates to a process for catalyst assisted production of crude bio-oil from biomass, which involves heating a mixture of biomass slurry and a catalyst at a temperature ranging from 200 to 350° C. and at a pressure ranging from 70 to 250 bars to obtain a mass containing the crude bio-oil. The crude bio-oil is separated from said mass to obtain a separated crude bio-oil. The catalyst being soluble in water is recovered from the aqueous phase and is reused for the preparation of crude bio-oil from biomass.

9 Claims, No Drawings

CATALYST ASSISTED HYDROTHERMAL CONVERSION OF BIOMASS TO CRUDE BIO-OIL

This application is a patent of addition with respect to Indian Patent Application No. 2899/MUM/2013 dated Jun. 9, 2013, the entire contents of which, are specifically incorporated herein by reference.

CROSS-REFERENCE TO RELATED APPLICATION

This Application is a Section 371 National Stage Application of International Application No. PCT/IB2015/051541, filed 3 Mar. 2015 and published as WO 2015/145279 A1 on 1 Oct. 2015, in English, the contents of which are hereby incorporated by reference in their entirety.

FIELD

The present disclosure relates to catalyst assisted hydrothermal conversion of biomass to crude bio-oil.

Definitions

As used in the present disclosure, the following words and phrases are generally intended to have the meaning as set forth below, except to the extent that the context in which they are used to indicate otherwise.

Biomass:

The term biomass in the context of the present disclosure means material such as organic waste, urban refuse, wood, agricultural crops or wastes, municipal wastes and the like, which can be used as a source of fuel or energy.

Crude Bio-Oil:

The term crude bio-oil used in the context of the present disclosure means an oil or biofuel derived from a biomass and which can be used as an alternative to petroleum fuel.

BACKGROUND

Biomass, a renewable energy source, can either be used directly via combustion to produce heat, or indirectly after converting it to various forms of biofuels. Biofuels are derived from biomass and are intended to provide an alternative to petroleum fuels. Conversion of biomass to biofuel can be achieved by different methods which are broadly classified into thermal, chemical and biochemical methods. Biomass is a resource that shows promise for advanced biofuels.

Fossil fuels such as petroleum, natural gas and coal are typically formed through the processes of thermochemical conversion (TCC) from biomass buried beneath the ground.

TCC is a chemical reforming process of biomass in a heated and usually pressurized, oxygen deprived enclosure, where long—chain organic compounds break down into short—chain hydrocarbons such as syngas or oil. TCC is a broad term that includes gasification, including the Fischer—Tropsch process, direct liquefaction, hydrothermal liquefaction and pyrolysis.

Pyrolysis is a heating process of dried biomass to directly produce syngas and/or oil. Both gasification and pyrolysis require dried biomass as feedstock and the processes occur in an environment higher than 600° C.

Hydrothermal liquefaction (HTL) is a technology for converting high-moisture waste biomass into energy dense "crude bio-oil" that can be used for direct combustion or refined for transportation grade fuels.

HTL, also called hydrous pyrolysis, is a process for the reduction of complex organic material such as bio—waste or biomass into crude oil and other chemicals.

Hydrothermal Liquefaction (HTL) technique, which involves the application of heat and pressure on the biomass medium, has an advantage that the lipids and other organic components can be efficiently converted while the biomass is in wet condition. During HTL, high moisture biomass is subjected to elevated temperature (250-400° C.) and pressure (up to 225 bars) in order to break down and reform the chemical building blocks into crude bio-oil. HTL of biomass gives only crude bio-oil that needs to be further treated/refined to get finished products. The hydrothermal process breaks down bio macromolecules in the wet biomass and promotes heteroatom removal.

Lipids present in crude bio-oil (CBO) can be extracted by solvent extraction or by physical extraction. However, such techniques may not be able to extract the lipids completely. In order to make biomass an economically viable alternative for bio crude production, the revenues from all their fractions (and not only the lipids) need to be maximized. A high temperature and high pressure is required for thermochemical conversion, in order to processes the whole biomass and produce the crude bio-oil. However, HTL of biomass without catalyst gives about 40% crude bio-oil yield.

WO2010030196 suggests the use of phosphate catalyst for hydrothermal conversion of biomass to crude bio-oil (CBO). Although the products formed from the process are useful, the recovery of the catalyst used in the process is difficult and fresh catalyst needs to be added to each reaction. Also, the phosphate catalyst usually operates at a pH greater than 7, which may have a limiting action on the product range. Metal oxides are also known to provide catalytic activity for conversion of biomass to CBO; these again use basic conditions and there are costs associated with the recovery of the catalyst.

There is, therefore, a need to develop a catalyst assisted hydrothermal process for the conversion of biomass to crude bio-oil (CBO) at high temperature and pressure, which is efficient and cost effective. The present invention discloses a catalyst assisted hydrothermal conversion of biomass to CBO with a high productivity and makes use of catalysts that can be recovered, recycled and reused.

Objects

Some of the objects of the present disclosure which at least one embodiment is adapted to provide, are described herein below:

It is an object of the present disclosure to provide a simple and energy efficient process for conversion of biomass to crude bio-oil in the presence of a catalyst.

It is another object of the present disclosure to provide a process capable of producing crude bio-oil compatible with crude used in a refinery process.

It is still another object of the present disclosure to provide a process which is capable of producing crude bio-oil containing high carbon content.

It is yet another object of the present disclosure to provide a recyclable and re-generable catalyst for the conversion of biomass to crude bio-oil.

Other objects and advantages of the present disclosure will be more apparent from the following description which is not intended to limit the scope of the present disclosure.

SUMMARY

The present disclosure relates to a catalyst assisted process for the conversion of biomass to crude bio-oil. In accordance with the present disclosure bio-oil is produced from biomass at high temperature and pressure by using a catalyst, optionally, in the presence of a reactive gas (such as hydrogen). The catalyst in accordance with the present disclosure is selected from the group comprising surfactants, ionic liquids and a combination thereof. The crude bio-oil prepared in accordance with the present disclosure is compatible with the petroleum crude used in a refinery.

DETAILED DESCRIPTION

The co-pending patent application No. 2899/MUM/2013 overcomes the drawbacks associated with the known hydrothermal liquefaction methods for the conversion of biomass to crude bio-oil, such as time consumption, energy consumption and low yield and discloses a simple, energy efficient, time saving and high yielding process for hydrothermal conversion of biomass to bio-crude. 2899/MUM/2013 particularly provides a method for the preparation of a catalyst at a room temperature having improved catalytic activity when used for hydrothermal conversion of biomass to crude bio-oil. However, the crude bio-oil obtained is incompatible with petroleum crude oil as it contains free fatty acids, N-containing heterocyclic compounds, polycyclic aromatics, unsaturated compounds and other undetectable heavier molecules.

The present disclosure focuses on producing crude bio-oil from biomass which is compatible with petroleum crude used in refinery process.

Accordingly, the present disclosure provides a process for catalyst assisted production of crude bio-oil from biomass. The process comprises the following steps:

In the first step, a slurry of a bio-mass is prepared in a medium. The concentration of the biomass in the slurry ranges from 5 to 35 wt %, the medium includes water or demineralized water.

The biomass utilized for preparing slurry is an alga selected from the group comprising Chlorophytes, Cyanophytes, Heterokontophytes and Protists. Non-limiting examples of Chlorophytes include *Chlorella, Oedogonium, Dictyosphaerium, Spirogyra, Chara, Nitella* and *Hydrodictyon*. Non-limiting examples of Cyanophytes include *Spirulina, Microcystis, Anabaena, Nodularia, Oscillatoria* and *Phormidium*. Heterokontophytes like *Nannochloropsis* and Protists like *Euglena* can also be utilized for production of crude bio-oil.

In the second step, a catalyst is added to the biomass slurry to obtain a mixture. The amount of the catalyst added to the biomass slurry ranges from 1 to 20 wt % with respect to the biomass.

The catalyst in accordance with the present invention comprises at least one selected from the group comprising at least one surfactant, at least one ionic liquid or a combination thereof. The presence of surfactant assists through its phase transfer catalytic functionality and/or very efficient cell wall rupturing, hence, results in the extraction of more oil components.

The surfactant catalyst in accordance with the present disclosure can be anionic, cationic and nonionic in nature.

The surfactant components may include but are not limited to cations of quaternary ammonium, dimethylammonium, pyridinium, alkonium, benzothonium, cetrimonium, benzyl, alkyl benzenes with any one anion of fluoride, chloride, bromide and iodide. In an exemplary embodiment of the present disclosure, the cationic surfactant used for the HTL conversion of biomass to CBO is cetyltrimethylammonium bromide.

The surfactant catalyst used for the HTL conversion of biomass to CBO can be an anionic surfactant containing anionic functional groups at their head. The anionic surfactants include but are not limited to sulphate, sulfonate, phosphate and carboxylates. Non-limiting examples of the anionic surfactants include ammonium lauryl sulphate, sodium lauryl sulphate, sodium dodecyl sulphate, dioctyl sodium sulfosuccinate, perfluorooctanesulfonate, perfluorobutanesulfonate, linear alkylbenzene sulfonates, sodium lauroyl sarcosinate, perfluorononanoate, and perfluorooctanoate.

Non-limiting examples of non-ionic surfactants include fatty alcohols, cetyl alcohol, stearyl alcohol, cetostearyl alcohol, oleyl alcohol, polyoxyethylene glycol alkyl ethers, octaethylene glycol monododecyl ether, pentaethylene glycol monododecyl ether, polyoxypropylene glycol alkyl ethers, glucoside alkyl ethers, decyl glucoside, lauryl glucoside, octyl gluco side, polyoxyethylene glycol octylphenol ethers, polyoxyethylene glycol alkylphenol ethers, nonoxynol-9, glycerol alkyl esters (glyceryl laurate), polyoxyethylene glycol sorbitan alkyl esters, sorbitan alkyl esters, cocamide MEA, cocamide DEA, dodecyldimethylamine oxide, block copolymers of polyethylene glycol, polypropylene glycol and polyethoxylated tallow amine.

The ionic liquid catalysts used in accordance with the present disclosure include cations of quaternary ammonium, pyridinium, imidazolium, pyrazolium, pyrrolidinium, piperidinium and an anion of fluoride, chloride or bromide or iodide or sulphonate, but not limited to, oleate, sulphate, hydrogensulphates, oxalates, triflates, borates, phosphates, imides, cyanamides, cyanoborates, fluoroborates, fluoroacetates, cyanomethanes and toluenesulfonates.

Non-limiting examples of cations in accordance with the present disclosure include but are not limited to tetraalkylammonium, tetraalkylphosphonium, trialkylsulfonium, N-alkylpyridinium, and 1,3-dialkylimidazolium.

Non-limiting examples of the anions in accordance with the present disclosure include but are not limited to $BF_4^-$, $PF_6^-$, $SbF_6^-$, $NO_3^-$, $(CF_3SO_3)2N^-$, $ArSO_3^-$, $CF_3CO_2^-$, $CH_3CO_2^-$ and $Al_2Cl_7^-$.

In the third step, the mixture comprising the biomass slurry and the catalyst is heated at a temperature ranging from 200 to 350° C. and at a pressure ranging from 70 to 250 bars for a time period ranging from 10 to 180 minutes to obtain a mass containing crude bio-oil, residue and the catalyst.

Optionally, the mixture is heated in the presence of a reactive gas, such as hydrogen gas and methane ($CH_4$).

The reaction can also be carried out in the absence of the reactive gas.

During the course of heating the biomass breaks down and reforms the chemical building blocks into crude bio-oil. The hydrothermal process employing the catalyst of the present disclosure breaks down the bio macromolecules present in the biomass and promotes the removal of heteroatoms to result into crude bio-oil.

Further, after cooling, the resultant products are collected, filtered and separated using techniques such as filtration/centrifugation/separation/concentration of the products. Depending upon the biomass, hydrothermal treatment conditions and catalyst, crude bio-oil yield observed varies from 40 to 78%.

The surfactant and ionic liquid catalyst are highly soluble in water and hence, can be recovered in the aqueous phase upon separation of crude bio-oil from the product mixture. The recovery of catalyst from the aqueous phase is carried out through techniques such as distillation, recrystallization and the like.

The catalyst so recovered can be used in the next cycle of the conversion of biomass to bio-oil.

The yield of the crude bio-oil obtained by the process of the present disclosure using the catalyst as specified above ranges from 40 to 78% and the carbon content of said crude bio-oil ranges from 60 to 80%. The catalyst of the present disclosure is highly stable during the hydrothermal liquefaction.

The present disclosure is further described in light of the following example which is set forth for illustration purpose only and not to be construed for limiting the scope of the disclosure.

General Example 1

Catalytic Hydrothermal Liquefaction Using Algal Biomass

Predetermined quantity of algal powder was taken and 20% slurry in water was prepared. The slurry was loaded in a 300 ml capacity HTHP reactor. 10 wt. % of powdered catalyst (1.956 g w.r.t. ash and moisture free algae) of the present disclosure was added to the reactor, as specified in Table-1 and Table-2. The reactor was then closed. Leak check was done using nitrogen at 120 bar. Nitrogen pressure was released and required amount of fresh nitrogen (35 bar) was filled and heated to a reaction temperature of 350° C. with 500 rpm stirring speed. The reactor was kept at the same condition for 30 minutes after reaching the temperature of 350° C. After 30 minutes, the reactor was cooled using chilled water and the gas was collected for gas analysis. After cooling, the reactor was opened and the product was collected in a beaker. Oil, aqueous and solid phases were separated and measured individually. The mixture was filtered using a Buckner flask. The obtained powder was washed with dichloromethane and water, and dried. The liquids (Oil and aqueous phase) were separated by gravimetric method.

The hydrothermal liquefaction of algal biomass using a catalyst was carried out in accordance with the amount specified in Table-1 and Table-2.

TABLE 1

Surfactant catalyst assisted HTL performance

| S. No. | Algae | Quantity of Algae (g) | Surfactant Catalyst | Quantity of Catalyst (wt %) | CBO Yield (%) |
| --- | --- | --- | --- | --- | --- |
| 1 | Spirulina | 23 | Cetyltrimethylammonium bromide | 10 | 63 |
| 2 | Nannochloropsis | 22 | Cetyltrimethylammonium bromide | 10 | 78 |
| 3 | Chlorella | 29 | Cetyltrimethylammonium bromide | 10 | 56 |
| 4 | Blue green algae | 35 | Cetyltrimethylammonium bromide | 10 | 52 |
| 5 | Spirulina | 23 | Pluronic copolymer-123 | 10 | 64 |
| 6 | Nannochloropsis | 22 | Pluronic copolymer-123 | 10 | 72 |
| 7 | Nannochloropsis | 22 | Trioctylmethylammonium chloride | 10 | 75 |
| 8 | Nannochloropsis | 22 | Butyltriethylammonium bromide | 10 | 67 |
| 9 | Nannochloropsis | 22 | Polyethylene glycol (6000) | 10 | 68 |
| 10 | Nannochloropsis | 22 | Sodium lauryl sulphate | 10 | 70 |
| 11 | Nannochloropsis | 22 | Sorbitan trioleate | 10 | 77 |
| 12 | Nannochloropsis | 22 | Mixture of Cat with Sr. No. 1 and 5 | 10 | 79 |
| 13# | Nannochloropsis | 22 | (Cetyltrimethylammonium bromide) | 10 | 80 |
| 14* | Nannochloropsis | 22 | Recovered aqueous phase | 10 | 75 |

Algae slurry concentration (35%);
*Catalyst recycle study (aqueous phase of Sr. No. 2 used as catalyst source

TABLE 2

Ionic liquid catalyst assisted HTL performance

| S. No. | Algae | Quantity of Algae (g) | Ionic Liquids (IL) | Quantity of Catalyst (wt %) | CBO Yield (%) |
| --- | --- | --- | --- | --- | --- |
| 1 | Spirulina | 23 | Methyltrioctylammonium chloride | 10 | 58 |

TABLE 2-continued

Ionic liquid catalyst assisted HTL performance

| S. No. | Algae | Quantity of Algae (g) | Ionic Liquids (IL) | Quantity of Catalyst (wt %) | CBO Yield (%) |
|---|---|---|---|---|---|
| 2 | Spirulina | 23 | 1-Methyl-3-octylimidazolim chloride | 10 | 57 |
| 3 | Spirulina | 23 | 1-Methyl-3-octylimidazolim tetrafluoroborate | 10 | 48 |
| 4 | Spirulina | 23 | 1-butyl-1-methylpyrrolidinium chloride | 10 | 61 |
| 5 | Spirulina | 23 | Pyridinium trifluoromethanesulfonate | 10 | 58 |
| 6 | Spirulina | 23 | Pyridinium tribromide | 10 | 59 |
| 7 | Spirulina | 23 | 1-methyl-3-octylimidazolium hexafluorophosphate | 10 | 59 |
| 8 | Spirulina | 23 | 1-methyl-3-octylimidazolium trifluoromethanesulfonate | 10 | 59 |
| 9 | Spirulina | 23 | 1-butyl-3-methylimidazolium chloride | 10 | 52 |
| 10 | Nannochloropsis | 22 | 1-methyl-3-octylimidazolium trifluoromethanesulfonate | 10 | 65 |

From the results, it clear that % HTL oil yield by the process of the present disclosure using a catalyst ranges from 48 to 80%. It is particularly found that using Cetyltrimethylammonium as a catalyst for liquefaction of *Nannochloropsis* resulted in an oil yield from 67 to 80%. An oil yield of 80% was obtained when 35% slurry of *Nannochloropsis* was used for the hydrothermal liquefaction instead of 20% biomass slurry.

Technical Advance and Economic Significance

The present disclosure provides a simple, energy efficient, time saving and high yielding process for catalyst assisted production of crude bio-oil from biomass.

The present disclosure provides a process which is capable of producing bio-oil compatible with petroleum crude oil.

The present disclosure provides a process which is capable of producing bio-oil containing high carbon content.

The present disclosure provides bio-oil which is free from heteroatoms such as oxygen, nitrogen, sulfur and phosphorus.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the disclosure to achieve one or more of the desired objects or results.

Any discussion of documents, acts, materials, devices, articles or the like that has been included in this specification is solely for the purpose of providing a context for the disclosure. It is not to be taken as an admission that any or all of these matters form a part of the prior art base or were common general knowledge in the field relevant to the disclosure as it existed anywhere before the priority date of this application.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification specific to the contrary.

While considerable emphasis has been placed herein on the specific features of the preferred embodiment, it will be appreciated that many additional features can be added and that many changes can be made in the preferred embodiment without departing from the principles of the disclosure. These and other changes in the preferred embodiment of the disclosure will be apparent to those skilled in the art from the disclosure herein, whereby it is to be distinctly understood that the foregoing descriptive matter is to be interpreted merely as illustrative of the disclosure and not as a limitation.

The invention claimed is:

1. A process for preparing crude bio-oil; said process consisting of the following steps:
    a. preparing a biomass slurry;
    b. adding at least one catalyst selected from the group consisting of ionic liquids and surfactants to said biomass slurry to obtain a mixture, wherein said surfactant is at least one selected from the group comprising cationic surfactants and non-ionic surfactants;
    c. heating said mixture at a temperature ranging from 200 to 350° C. and at a pressure ranging from 70 to 250 bars for a time period ranging from 10 to 180 minutes to obtain a mass containing said crude bio-oil; and
    d. separating the crude bio-oil from the mass to obtain a separated crude bio-oil and an aqueous phase containing said catalyst;
        wherein the method step (d) further comprises recovering and recycling said catalyst from said aqueous phase.

2. The process as claimed in claim 1, wherein the method step (c) optionally comprises heating said mixture in the presence of a reactive gas.

3. The process as claimed in claim 1, wherein a concentration of said biomass in the slurry ranges from 5 to 35 wt %, and said biomass is at least one alga selected from the group consisting Chlorophytes, Cyanophytes, Heterokontophytes and Protists.

4. The process as claimed in claim 3, wherein said alga is at least one selected from the group consisting *Chlorella, Oedogonium, Dictyosphaerium, Spirogyra, Chara, Nitella, Hydrodictyon, Spirulina, Microcystis, Anabaena, Nodularia, Oscillatoria, Phormidium, Nannochloropsis* and *Euglena*.

5. The process as claimed in claim 1, wherein a carbon content of said crude bio-oil ranges between 60 and 80%.

6. The process as claimed in claim 1, wherein the amount of said catalyst added to the said biomass slurry ranges from 1 to 20 wt % with respect to said biomass.

7. The process as claimed in claim 1, wherein the cationic surfactant is at least one compound selected from the group comprising quaternary ammonium, dimethylammonium, pyridinium, alkonium, benzothonium, cetrimonium, benzyl and alkyl benzene.

8. The process as claimed in claim 1, wherein the nonionic surfactant is at least one compound selected from the group comprising fatty alcohols, cetyl alcohol, stearyl alcohol, cetostearyl alcohol, oleyl alcohol, polyoxyethylene glycol alkyl ethers, octaethylene glycol monododecyl ether, pentaethylene glycol monododecyl ether, polyoxypropylene glycol alkyl ethers, glucoside alkyl ethers, decyl glucoside, lauryl glucoside, octyl glucoside, polyoxyethylene glycol octylphenol ethers, polyoxyethylene glycol alkylphenol ethers, nonoxynol-9, glycerol alkyl esters (glyceryl laurate), polyoxyethylene glycol sorbitan alkyl esters, sorbitan alkyl esters, cocamide MEA, cocamide DEA, dodecyldimethylamine oxide, block copolymers of polyethylene glycol, polypropylene glycol and polyethoxylated tallow amine.

9. The process as claimed in claim 1, wherein the ionic liquid is at least one compound selected from the group comprising tetraalkylammonium, tetraalkylphosphonium, trialkylsulfonium, N-alkylpyridinium, 1, 3-dialkylimidazolium, $BF_4^-$, $PF_6^-$, $SbF_6^-$, $NO_3^-$, $(CF_3SO_3)2N^-$, $ArSO_3^-$, $CF_3CO_2^-$, $CH_3CO_2^-$ and $Al_2Cl_7^-$.

* * * * *